(12) United States Patent
Brewer (10) Patent No.: US 9,316,125 B2
(45) Date of Patent: Apr. 19, 2016

(54) THERMAL ENERGY CONVERSION SYSTEM

(75) Inventor: Michael Anthony Brewer, Centennial, CO (US)

(73) Assignee: Gravaton Energy Resources Ltd. LLC, Lakewood, CO (US)

( * ) Notice: Subject to any disclaimer, the term of this patent is extended or adjusted under 35 U.S.C. 154(b) by 451 days.

(21) Appl. No.: 13/541,829

(22) Filed: Jul. 5, 2012

(65) Prior Publication Data

US 2013/0174554 A1 Jul. 11, 2013

Related U.S. Application Data

(63) Continuation-in-part of application No. PCT/US2011/067619, filed on Dec. 28, 2011.

(60) Provisional application No. 61/460,193, filed on Dec. 29, 2010.

(51) Int. Cl.
| | |
|---|---|
| *F01K 27/00* | (2006.01) |
| *F03G 1/00* | (2006.01) |
| *F03G 3/00* | (2006.01) |
| *F03G 7/06* | (2006.01) |

(52) U.S. Cl.
CPC . *F01K 27/00* (2013.01); *F03G 1/00* (2013.01); *F03G 3/00* (2013.01); *F03G 7/06* (2013.01)

(58) Field of Classification Search
CPC ............... F02C 1/02; F02C 1/04; F02C 6/16; Y02E 60/15; Y02E 10/46; F03G 6/00; F03G 7/04; Y02T 10/16
USPC ............................ 60/698, 659, 641.14; 137/1
See application file for complete search history.

(56) References Cited

U.S. PATENT DOCUMENTS

| | | | |
|---|---|---|---|
| 3,741,227 A | * | 6/1973 | Mokadam et al. ................. 137/1 |
| 4,077,220 A | | 3/1978 | Matthews |
| 4,094,146 A | * | 6/1978 | Schweitzer ................ 60/641.14 |

(Continued)

FOREIGN PATENT DOCUMENTS

| | | |
|---|---|---|
| JP | 57-191479 A | 11/1982 |
| WO | 0047892 A1 | 8/2000 |
| WO | 2010/026678 A1 | 3/2010 |

OTHER PUBLICATIONS

IEEE Dict_and OneLook Dict Results, collected on Oct. 29, 2014.*

(Continued)

*Primary Examiner* — Jorge Pereiro
*Assistant Examiner* — Paul Thiede
(74) *Attorney, Agent, or Firm* — Wiley Rein LLP (57) ABSTRACT

A power generation system includes a first vessel having a generally constant volume and a second vessel having a variable volume. Thermal energy is supplied to an ideal gas within the first vessel in order to raise its temperature and pressure. The thermally compressed gas is then released into, and expands the volume of, the second vessel. The expanding volume of the second vessel expands raises a mass and/or strains an elastic member, thus storing gravitational and/or elastic potential energy. This stored potential energy can be released on demand by evacuating the second vessel, typically into a third vessel, and used to power a generator. Preferably, the potential energy is used to coupled to the generator using a planetary gear drive, such that a relatively small number of input rotations yields a relatively large number of output rotations.

14 Claims, 4 Drawing Sheets

(56) References Cited

U.S. PATENT DOCUMENTS

| | | | |
|---|---|---|---|
| 4,180,982 | A | 1/1980 | Siegel |
| 4,203,295 | A | 5/1980 | Siegel |
| 4,306,414 | A | 12/1981 | Kuhns |
| 4,464,095 | A | 8/1984 | Iida |
| 4,821,516 | A | 4/1989 | Isshiki |
| 5,174,741 | A | 12/1992 | Tohgo |
| 5,809,784 | A | 9/1998 | Kreuter |
| 5,850,758 | A | 12/1998 | McCloud |
| 6,374,607 | B1 | 4/2002 | Takabu |
| 6,484,498 | B1 | 11/2002 | Bonar |
| 6,647,725 | B1 | 11/2003 | Letovsky |
| 7,566,979 | B1 | 7/2009 | Hartman et al. |
| 7,675,187 | B2 | 3/2010 | Woods et al. |
| 7,690,199 | B2 | 4/2010 | Wood |
| 2005/0180862 | A1* | 8/2005 | Lando ............... 417/316 |
| 2007/0245735 | A1 | 10/2007 | Ashikian |
| 2009/0047564 | A1 | 2/2009 | Touvard |
| 2010/0205960 | A1* | 8/2010 | McBride et al. ............ 60/641.2 |

OTHER PUBLICATIONS

International Search Report and Written Opinion of International Application No. PCT/US2011/067619 dated Dec. 28, 2011.
Ewing, The Steam-Engine and Other Heat Engines, pp. 41-42 (1910).
"Brownian Ratchet" Wikipedia article, last modified on Jul. 14, 2013.
Zhang et al., "Performance Characteristics of an Irreversible Thermally Driven Brownian Microscopic Heat Engine," Euro. Phys. Journal B 53, 481-485 (2006).
Kaneko et al., "Development of Reciprocating Heat Engine Using Shape Memory Alloy (Ratche Type Drive System with Self-Drive Rotational Valve)," Department of Mechanical Engineering, vol. 6, No. 1, 2011.
Extended European Search Report in European Application No. 11852971.8, mailed Dec. 17, 2014.

* cited by examiner

THERMAL ENERGY CONVERSION SYSTEM

CROSS-REFERENCE TO RELATED APPLICATIONS

This application is a continuation-in-part of Patent Cooperation Treaty application no. PCT/US11/067619, filed 28 Dec. 2011, now pending, which claims priority to U.S. provisional application No. 61/460,193, filed 29 Dec. 2010. The foregoing are hereby incorporated by reference as though fully set forth herein.

BACKGROUND OF THE INVENTION a. Field of the Invention

The instant invention relates to power generation. In particular, the instant invention relates to the generation of electrical power from thermal energy.

b. Background Art

Electricity, and its ready availability, are very important to the modern lifestyle. Power generation systems produce electricity from other energy sources, such as fossil fuels (e.g., coal, petroleum, natural gas) or nuclear materials.

Many power generation systems attempt to harness thermal energy, such as solar energy or geothermal energy, for conversion to electrical energy. For example, U.S. Pat. No. 6,374,607 to Takabu discloses an apparatus that includes facing high- and low-temperature sections with a bimetallic strip interposed therebetween. The bimetallic strip is attached to a rotary member. As the bimetallic strip is heated by the high-temperature section, it flexes towards the low-temperature section, where it cools and flexes back to the high-temperature section, thereby inducing reciprocating motion that causes the rotary member to turn and generate electricity.

Extant power generation systems, however, are subject to numerous disadvantages. For example, to generate appreciable electricity, a solar farm must occupy a very large surface area (that is, it has a very large physical footprint). Other power generation systems have undesirable carbon footprints. Still other power generation systems exhibit low output and/or low efficiency.

BRIEF SUMMARY OF THE INVENTION

It would be desirable to provide a power generation system that addresses the shortcomings of extant power generation systems.

It is therefore an object of the present invention to provide a power generation system that converts thermal energy to electrical energy with greater efficiency than extant power generation systems.

Another object of the present invention is to provide a more compact system to generate electricity from thermal energy.

Disclosed herein is a power generation system that includes: at least one thermal energy accumulation vessel containing a gas; a potential energy generation system, including at least one battery vessel connected to the at least one thermal energy accumulation vessel and having a variable volume; a thermal energy dissipation vessel connected to the at least one battery vessel; and an energy conversion system, preferably including a planetary gear drive, coupled to the potential energy generation system. The potential energy generation system generates and stores potential energy via expansion of the volume of the at least one battery vessel when a quantity of the gas moves from the at least one thermal energy accumulation vessel to the at least one battery vessel after increasing in temperature while in the at least one thermal energy accumulation vessel. In turn, the energy conversion system converts potential energy stored by the potential energy generation system into electrical energy when a quantity of the gas is evacuated from the at least one battery vessel to the thermal energy dissipation vessel after expansion of the volume of the at least one battery vessel.

According to one aspect of the present invention, the at least one battery vessel includes a movable mass, such that the expansion of the volume of the at least one battery vessel raises the movable mass, thereby generating and storing gravitational potential energy. In another aspect of the present invention, the at least one battery vessel comprises a spring or other elastic element, such that expansion of the volume of the at least one battery vessel changes the length of the spring (e.g., places the spring in either tension or compression), thereby increasing the strain on the spring and generating and storing elastic potential energy.

To facilitate sealing the at least one battery vessel, it is contemplated that the at least one battery vessel can include a bellows or bellows-like structure.

To increase the rate at which the gas is thermally compressed within the at least one thermal energy accumulation vessel, it is contemplated that the thermal energy accumulation vessel can include a plurality of thermal energy accumulation chambers and/or a plurality of successive thermal energy accumulation stages.

Preferably, the at least one thermal energy accumulation vessel is connected to the at least one battery vessel via at least one one-way valve. Likewise, it is preferable for the at least one battery vessel to be connected to the at least one thermal energy dissipation vessel via at least one one-way valve. Optionally, these one-way valves may be automatically actuated. For example, an electronic controller can be programmed (1) to open the valve(s) connecting the thermal energy accumulation vessel to the battery vessel the when the gas in the at least one thermal energy accumulation vessel increases in temperature by a preset amount; (2) to close the valve(s) connecting the thermal energy accumulation vessel to the battery vessel when the potential energy generation system has generated and stored a preset amount of potential energy; (3) to open the valve(s) connecting the battery vessel and the thermal energy dissipation vessel when the potential energy generation system has generated and stored a preset amount of potential energy; and/or (4) to close the valve(s) connecting the battery vessel and the thermal energy dissipation vessel when a preset amount of the generated and stored potential energy is converted to electrical energy.

In some embodiments of the invention, gas is recycled throughout the system. Thus, the thermal energy dissipation vessel can be connected to the at least one thermal energy accumulation vessel, preferably via at least one one-way valve, which can optionally be automatically actuated. The power generation system can also include a reserve gas vessel, which will typically be connected to the at least one thermal energy accumulation vessel via a pressure regulator, in order to maintain a preset baseline pressure in the at least one thermal energy accumulation vessel.

It is contemplated that electrical energy can be stored in one or more electrical storage devices, for example in batteries or capacitors, that can be coupled to an output of the energy conversion system.

In another embodiment, a power generation system according to the present invention includes: a first vessel having a fixed volume and containing a gas; a second vessel including a movable element that allows for a volume of the second vessel to vary; a pressure line including a one-way valve coupling the first vessel to the second vessel; and an energy conversion system. The energy conversion system includes: a rotating input shaft; a rotating output shaft; a planetary gear drive coupling the rotating input shaft to the rotating output shaft; and an electrical generator. The rotating input shaft is coupled to the movable element such that, when the movable element moves to reduce the volume of the second vessel, the rotating input shaft rotates and the energy conversion system generates electricity. For example, a pulley system can be used to couple the rotating input shaft to the movable element. A decoupling mechanism can also be provided to decouple the movable element from the rotating input shaft when the movable element moves to increase the volume of the second vessel (e.g., when storing potential energy) and to couple the movable element to the rotating input shaft when the movable element moves to decrease the volume of the second vessel (e.g., when releasing potential energy).

Also disclosed herein is a method of power generation, including the following steps: thermally compressing a gas that obeys the ideal gas law in a first vessel having a constant volume; releasing the thermally compressed gas from the first vessel into a second vessel having a variable volume to increase the volume of the second vessel and store at least one of gravitational potential energy and elastic potential energy; releasing the gas from the second vessel, thus allowing the volume of the second vessel to decrease; and using a planetary gear drive to convert the stored potential energy into electrical energy as the volume of the second vessel decreases.

An advantage of the present invention is that converts over 80% of input thermal energy to electricity.

Another advantage of the present invention is that it is more compact than existing systems to convert thermal energy to electrical energy, particularly when compared to solar power systems.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
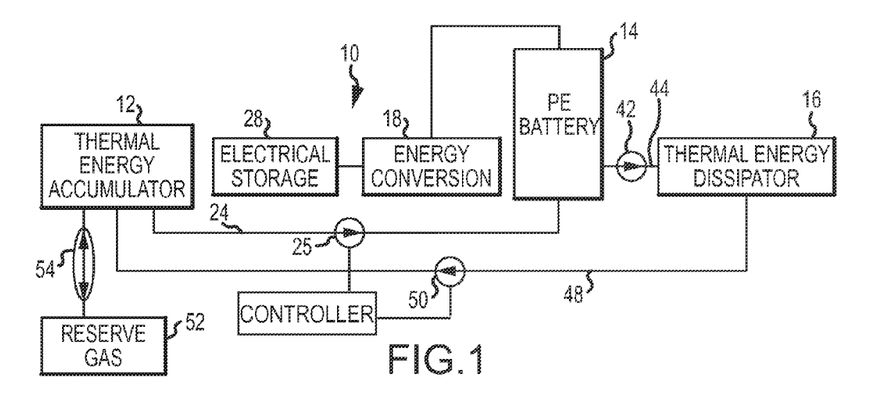
FIG. 1 is a schematic diagram of a power generation system according to the present teachings.

FIG. 1 is a schematic diagram of a power generation system 10 that converts thermal energy to electricity according to the teachings herein. Power generation system 10 generally includes at least one thermal energy accumulation vessel 12, a potential energy generation system including at least one battery vessel 14, a thermal energy dissipation vessel 16, and an energy conversion system 18 that converts potential energy generated and stored by the potential energy generation system into electrical energy. Thermal energy accumulation vessel 12 is connected to battery vessel 14, which is in turn connected to thermal energy dissipation vessel 16, which is itself connected to thermal energy accumulation vessel 12 via a series of one-way valves.

Power generation system 10 is charged with a gas, such as air, that obeys the ideal gas law, PV=nRT. Specifically, thermal energy accumulation vessel 12, which will typically have a constant volume $V_A$, is charged to an initial pressure $P_{A1}$ with an amount $n_{A1}$ of such a gas at a temperature $T_{A1}$. One of ordinary skill in the art will recognize, of course, that only two of these three quantities (e.g., $n_{A1}$ and $P_{A1}$) can be independent, while the third (e.g., $T_{A1}$) is dependent upon the other two.

Figure 8:
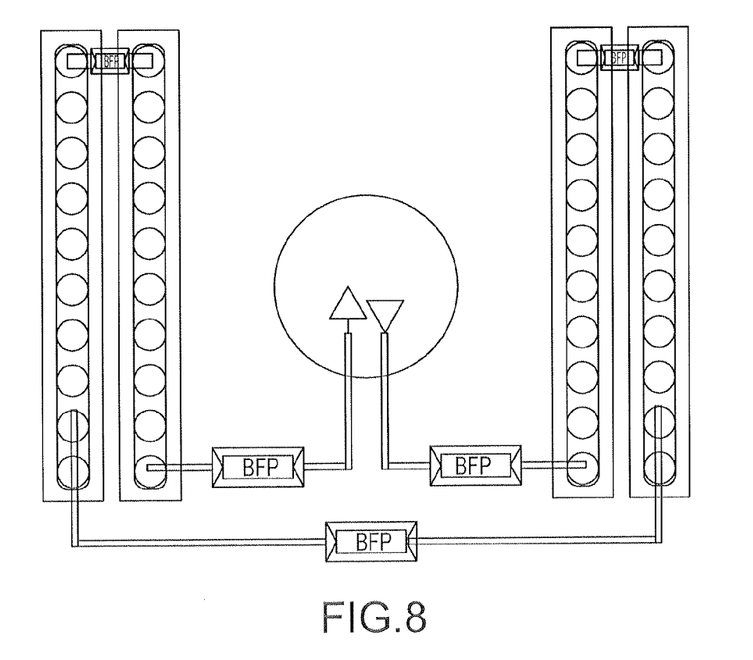
FIG. 8 illustrates an exemplary multi-stage, multi-chamber thermal energy accumulation vessel.

In one aspect of the invention, thermal energy accumulation vessel 12 is a single chamber. In another aspect of the invention, thermal energy accumulation vessel 12 contains a plurality of chambers. In still further aspects of the invention, thermal energy accumulation vessel 12 is a multi-stage device; each stage can include a single chamber or a plurality of chambers. FIG. 8, for example, depicts a multi-stage, multi-chamber embodiment of thermal energy accumulation vessel 12.

Thermal energy accumulation vessel 12 is designed to effect thermal compression of the gas contained therein. Thus, as one of ordinary skill in the art will appreciate from the instant disclosure and from well understood principles of thermodynamics and heat transfer, the design of thermal energy accumulation vessel 12 can vary considerably without departing from the spirit and scope of the present invention. Although certain contemplated embodiments of thermal energy accumulation vessel 12 are discussed in detail herein, the invention is not limited to these embodiments, and other configurations of thermal energy accumulation vessel 12 are equally within the spirit and scope of the present invention.

Figure 2:
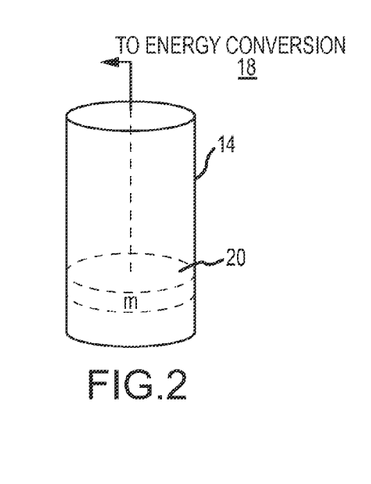
FIG. 2 depicts a battery vessel that utilizes a piston to generate and store gravitational potential energy.
Figure 3:
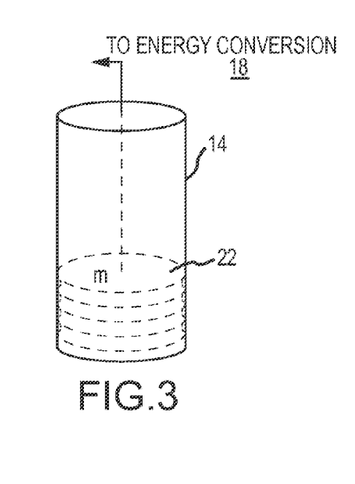
FIG. 3 depicts a battery vessel that utilizes a bellows-like structure to generate and store gravitational potential energy.

Unlike thermal energy accumulation vessel 12, battery vessel 14 has a variable volume. For example, as shown in FIG. 2, battery vessel 14 may include a piston 20 (shown in phantom) having a mass m that can move along the longitudinal axis of the generally cylindrical battery vessel 14. Alternatively, as shown in FIG. 3, battery vessel 14 may contain a bellows-like structure 22 (shown in phantom), also having a mass m, that can expand and contract along the longitudinal axis of the generally cylindrical battery vessel 14.

It is desirable that the initial position of piston 20 or bellows-like structure 22 allow for at least a small volume of gas to be present within battery vessel 14, such that piston 20 does not contact the bottom of battery vessel 14 or such that bellows-like structure 22 does not completely collapse upon itself. That is, the initial volume $V_{B1}$ of battery vessel 14 is non-zero, and there is an initial quantity $n_{B1}$ of gas within battery vessel 14.

Because piston 20 is free to move upwardly or downwardly, and bellows-like structure 22 is free to expand and contract, the absolute pressure $P_B$ within battery vessel 14 will remain relatively constant throughout the power generation cycle described herein. Using this equilibrium state, where the sum of all forces acting on piston 20 or bellows-like structure 22 is zero, $P_B$ can be determined from the equation $mg+P_{atm}A=P_B A$, where $P_{atm}$ is the local atmospheric pressure and A is the area over which the atmospheric pressure $P_{atm}$ and absolute pressures $P_B$ act (e.g., the surface area of piston 20).

Generation and Storage of Potential Energy

As one of ordinary skill in the art will appreciate, raising mass m of piston 20 or bellows-like structure 22 by a height $\Delta h$ will generate an increase in potential energy $\Delta U = mg\Delta h$. The increase in height $\Delta h$ of mass m coincides with an increase in the volume of battery vessel 14 from its initial volume $V_{B1}$ to an expanded volume $V_{B2}$, where $V_{B2} = V_{B1} + A\Delta h$.

Mass m can be driven to undergo the increase in height $\Delta h$ by supplying additional gas from thermal energy accumulation vessel 12 to battery vessel 14 via pressure line 24, which includes a one-way valve 25 that only permits gas flow from thermal energy accumulation vessel 12 to battery vessel 14, and that prohibits gas flow in the reverse direction. To accomplish this, the amount of gas $n_{A1}$ within thermal energy accumulation vessel 12 is subjected to a heating cycle that raises its temperature from $T_{A1}$ to $T_{A2}$. The gas within thermal energy accumulation vessel 12 is preferably heated by subjecting it to solar heating. Other methods of heating the gas within thermal energy accumulation vessel 12, such as subjecting it to waste heat from a manufacturing process or to geothermal heat sources, are also within the spirit and scope of the present invention, however.

The increase in temperature within thermal energy accumulation vessel 12 from $T_{A1}$ to $T_{A2}$ results in an increase in pressure within the thermal energy accumulation vessel 12 from $P_{A1}$ to $P_{A2}$ according to the ideal gas law. Specifically, because $V_A$ and $n_{A1}$ are constant during the heating process within thermal energy accumulation vessel 12, $$\frac{P_{A1}}{T_{A1}} = \frac{P_{A2}}{T_{A2}}.$$

Opening one-way valve 25 connecting thermal energy accumulation vessel 12 to battery vessel 14 allows this high pressure, high temperature gas to flow from thermal energy accumulation vessel 12 into battery vessel 14. To return piston 20 or bellows-like structure 22 to an equilibrium state (i.e., where the pressure within battery vessel 14 is $P_B$), the volume in battery vessel 14 must increase (e.g., from $V_{B1}$ to $V_{B2}$), as dictated by the ideal gas law in view of both the increased temperature of the gas within battery vessel 14 (e.g., from $T_{B1}$ to $T_{B2}$) and the increased amount of gas within battery vessel 14 (e.g., from $n_{B1}$ to $n_{B2}$).

For any given $\Delta h$, $V_{B2}$ can be computed according to the equation $V_{B2} = V_{B1} + A\Delta h$. The ideal gas law further provides that $$\frac{V_{B1}}{n_{B1}T_{B1}} = \frac{V_{B2}}{n_{B2}T_{B2}}.$$

Of course, $T_{B2} = T_{A2}$, and $(n_{B2} - n_{B1}) = (n_{A1} - n_{A2})$ (that is, the amount of gas that flows into battery vessel 14 is equal to the amount of gas that flows out of thermal energy accumulation vessel 12, and the temperature of the gas that flows into battery vessel 14 is equal to the temperature of the gas that flows out of thermal energy accumulation vessel 12).

Thus, it is possible to compute, for a given temperature increase from $T_{A1}$ to $T_{A2}$ within thermal energy accumulation vessel 12, the amount of gas $(n_{B2} - n_{B1})$ that needs to flow into battery vessel 14 to achieve a desired $\Delta h$. Likewise, for any given amount of gas $(n_{B2} - n_{B1})$ that flows into battery vessel 14, it is possible to compute the required temperature increase from $T_{A1}$ to $T_{A2}$ to achieve a desired $\Delta h$. Of course, the greater the increase in temperature, the less gas will be required to achieve the desired increase in volume of battery vessel 14 and vice versa. In effect, a known amount of thermal energy must be supplied from thermal energy accumulation vessel 12 to battery vessel 14 in order to effect the desired generation and storage of potential energy.

The relationships described above, along with other applications of the ideal gas law, can be leveraged to automatically actuate the opening and closing of one-way valve 25 to achieve the maximum $\Delta h$ (e.g., the maximum distance piston 20 can travel, or the maximum expansion bellows-like element 22 can achieve), thus yielding the maximum generation and storage of gravitational potential energy, in a single valve open-close cycle. For example, a controller can be programmed to open one-way valve 25 when the gas in thermal energy accumulation vessel 12 undergoes a preset temperature increase or pressure increase, as measured by an appropriate sensor (e.g., a temperature sensor or pressure gauge). Likewise, the controller can be programmed to close valve 25 when a preset amount of gas has passed into battery vessel 14 or when the volume of battery vessel 14 has increased by a preset amount, again as measured by an appropriate sensor (e.g. a sensor of the rotational position of an element of the planetary drive, as described in further detail below).

In an alternative embodiment of the invention, rather than (or in addition to) storing gravitational potential energy by raising a mass, the volume expansion in battery vessel 14 from $V_{B1}$ to $V_{B2}$ compresses a spring 26 (exemplary arrangement illustrated in FIG. 4) or places spring 26 in tension (exemplary arrangement illustrated in FIG. 5), thereby alternatively (or additionally) storing elastic potential energy (e.g., $U_E = \frac{1}{2}k(\Delta x)^2$), where k is the spring constant of spring 26 and $\Delta x$ is the distance by which the spring is stretched or compressed when the volume of battery vessel 14 increases from $V_{B1}$ to $V_{B2}$. Spring 26 can be a compression spring (such as a conical spring) or any other suitable elastic element.

Figure 4:
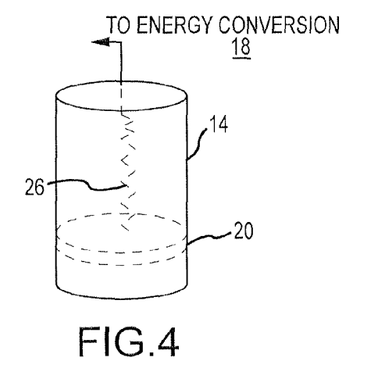
FIG. 4 depicts a battery vessel that compresses a spring to generate and store elastic potential energy.
Figure 5:
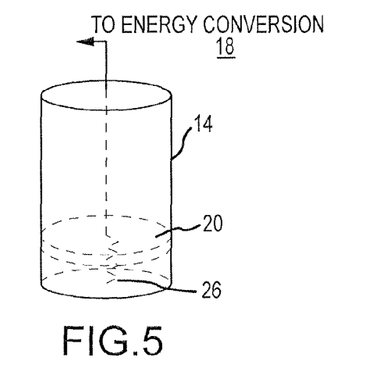
FIG. 5 depicts a battery vessel that places a spring in tension to generate and store elastic potential energy.

Although consideration of Hooke's law (i.e., $F = -kx$) will somewhat complicate the system of equations that must be solved to automatically control one-way valve 25 on pressure line 24 due to the changing equilibrium pressure within battery vessel 14 resulting from the use of spring 26 (e.g., the equilibrium pressure will increase as strain on the spring increases), one of ordinary skill in the art will appreciate how to solve this system of equations through application of the teachings herein in conjunction with well-understood principles of physics, engineering mechanics, and thermodynamics.

Thus, in general, power generation system 10 generates and stores potential energy by (1) allowing an ideal gas to increase in temperature and pressure within the fixed volume of thermal energy accumulation vessel 12; and (2) releasing the high temperature, high pressure gas into battery vessel 14, where it expands and raises a mass and/or changes the length of a spring as the volume of battery vessel 14 increases.

Conversion of Stored Potential Energy to Electrical Energy

Once a desired amount of gravitational and/or elastic potential energy has been generated and stored within the potential energy generation system (e.g., by raising the mass m of piston 20 or bellows-like structure 22 by a preset $\Delta h$ and/or by changing the length of spring 26 by a preset $\Delta x$), the stored potential energy can be released into energy conversion system 18 connected to the potential energy generation system. Energy conversion system 18, in turn, converts the potential energy into electrical energy. The resultant electrical energy can be used immediately to provide power to a connected electrical load, stored for later use in an electrical energy storage device 28 such as a battery or a capacitor, returned to an electrical power grid, or some combination thereof.

Figure 6:
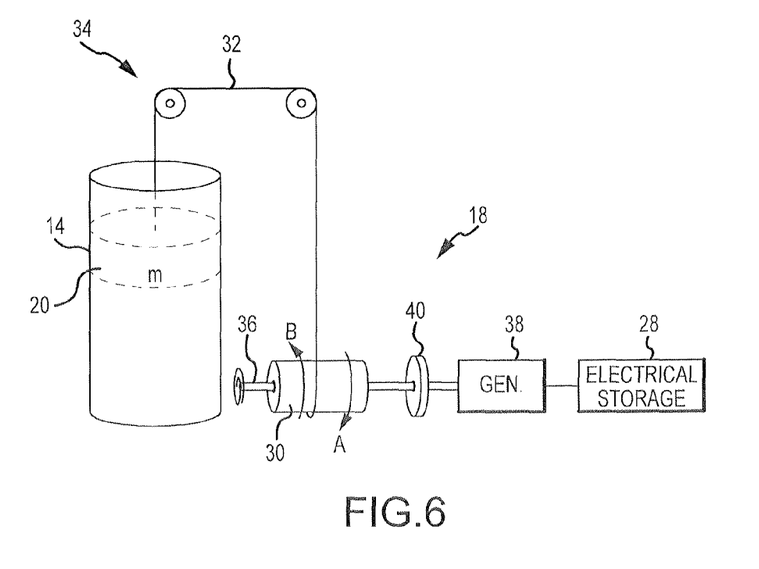
FIG. 6 is a schematic illustration of the interconnections between a battery vessel and an energy conversion system.

As illustrated in FIG. 6, energy conversion system 18 can include a rotating drum 30 that is connected to piston 20 (or, alternatively, bellows-like structure 22) via a cable 32 running through a pulley system 34. Cable 32 is wrapped around drum 30 so as to apply a torque thereto. As described in further detail below, the application of torque to drum 30 by cable 32 results in the generation of electrical energy at generator 38.

To take up slack in cable 32 as the volume of battery vessel 14 expands, drum 30 can be driven to rotate in a cable take-up direction shown by arrow "A" in FIG. 6. In some embodiments of the invention, drum 30 is driven in the cable take-up direction via a power spring 36 coupled to drum 30. Power spring 36 stores potential energy as mass m of piston 20 or bellows-like structure 22 descends (i.e., some of the potential energy generated and stored by battery vessel 14 is used to coil power spring 36 rather than being converted to electrical energy), and then releases this stored potential energy as mass m of piston 20 or bellows-like structure 22 rises, thereby driving drum 30 to take up slack in cable 32.

As an alternative to power spring 36, drum 30 could be fitted with a counterweight that is raised to store potential energy as mass m of piston 20 or bellows-like structure 22 descends (i.e., some of the potential energy generated and stored by battery vessel 14 is used to raise the counterweight rather than being converted to electrical energy), and that is allowed to descend to drive drum 30 to take up slack in cable 32 as mass m of piston 20 or bellows-like structure 22 ascends.

Drum 30 is preferably coupled to a generator 38 via a planetary gear drive 40. The use of planetary gear drive 40 allows a very small number of turns of drum 30, such as would be associated with the release of potential energy by battery vessel 14, to be converted into a much greater number of turns within generator 38, thereby increasing the electrical output of power generation system 10.

As described above, power spring 36 drives drum 30 to rotate in take-up direction A as mass m of piston 20 or bellows-like structure 22 ascends within battery vessel 14. A clutch mechanism can be employed to decouple drum 30 from generator 38 during the potential energy generation and storage phase of the power generation cycle by allowing "slip" in the system.

To release potential energy from battery vessel 14, one-way valve 42 on pressure line 44 connecting battery vessel 14 to thermal energy dissipation vessel 16 is opened, allowing the high pressure gas within battery vessel 14 to evacuate into thermal energy dissipation vessel 16. According to the ideal gas law, to maintain the equilibrium pressure (e.g., $P_B$) within battery vessel 14 as constant-temperature (e.g., $T_{B2}$) gas escapes to thermal energy dissipation vessel 16, the volume of battery vessel 14 must decrease (e.g., return to $V_{B1}$ from $V_{B2}$).

The decreasing volume of battery vessel 14, in turn, allows mass m of piston 20 or bellows-like structure 22 to descend. As mass m of piston 20 or bellows-like structure 22 descends, cable 32 is paid out and drum 30 rotates in a payout (e.g., power generation) direction shown by arrow "B" in FIG. 6. When drum 30 rotates in payout direction B, however, the clutch mechanism operates to couple drum 30 to generator 38 via planetary gear drive 40 (i.e., no "slip" is permitted), thereby generating an electrical output.

As one of ordinary skill in the art will recognize, spring 26 may not have a linear force curve. As a result, the force acting on drum 30 via cable 32 will not be constant, which may undesirably affect the electrical output of generator 38.

To help ensure a constant electrical output at generator 38, a relatively constant torque should be applied to drum 30. Torque, of course, is a product of force and distance. It is contemplated, therefore, to account for variation in the force applied to drum 30 via cable 32 by designing a drum 30 with a varying diameter, such that higher forces are applied at shorter distances than lower forces. Indeed, the profile of drum 30 can be custom-machined to match the force curve of spring 26, both mathematically and physically, to achieve a desirable substantially constant torque, and thus a substantially constant electrical output at generator 38.

Figure 9:
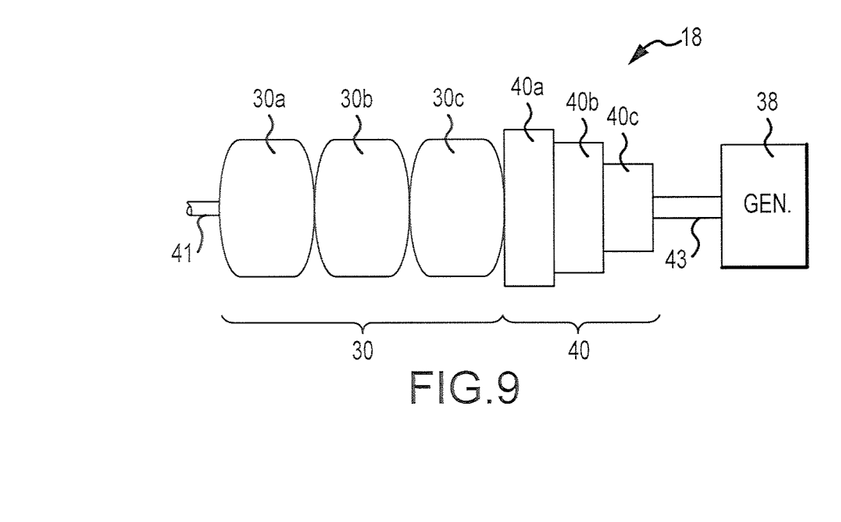
FIG. 9 schematically depicts one embodiment of an energy conversion system suitable for use in connection with the present invention.

One suitable embodiment of energy conversion system 18 is shown in FIG. 9. FIG. 9A schematically illustrates the use of multiple drums 30 (e.g., 30a, 30b, and 30c), each of which can be connected to its own unique battery vessel 14, such that there can be a one-to-many relationship between generator 38 and battery vessels 14.

Figure 10:
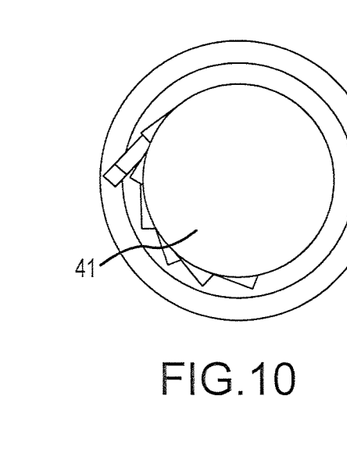
FIG. 10 illustrates a decoupling mechanism as may be employed in connection with the power generation system described herein.

Each drum 30 is internally coupled to a common drive shaft 41 via a mechanism that only couples drum 30 to drive shaft 41 when drum 30 is rotated in the payout/power generation direction as described further below. One suitable coupling mechanism, which employs a one-way ratchet mechanism, is shown in FIG. 10. When drum 30 rotates in direction A (e.g., under power of power spring 36), it "slips" over the ratchet mechanism and drive shaft 41 does not turn. On the other hand, when drum 30 rotates in direction B (e.g., under power of the potential energy stored by battery vessel 14), it engages the ratchet mechanism and turns drive shaft 41.

Rotating drive shaft 41 provides an input to planetary gear drive 40. As shown in FIG. 9, planetary gear drive 40 includes multiple stages (e.g., 40a, 40b, and 40c), with the output of a preceding stage (e.g., 40a) providing an input to a successive stage (e.g., 40b). The output of planetary gear drive 43 is the rotation of output shaft 43, which serves as an input to generator 38.

Each stage of planetary gear drive 40 includes a fixed central gear housing, an external central gear, and three compound planetary gears. Insofar as the design (e.g., selection of gear ratios) and operation (e.g., relation of input and output torques and forces) of a planetary gear drive 40 will be familiar to the ordinarily skilled artisan, however, it is not explained in further detail herein.

One-way valve 42 connecting battery vessel 14 to thermal energy dissipation vessel 16 can also be automatically actuated. For example, a controller can be programmed to open one-way valve 42 when a preset amount of potential energy has been stored in battery vessel 14 and to close one-way valve 42 when a preset amount of the stored potential energy has been converted to electrical energy.

Figure 7:
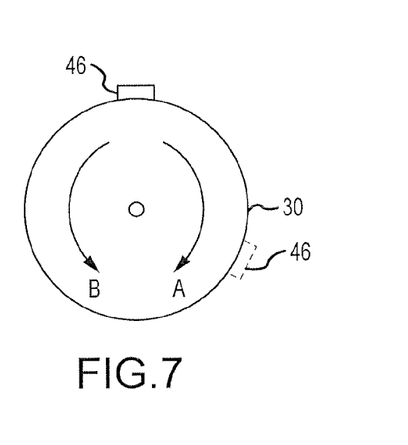
FIG. 7 illustrates the use of a rotational position sensor within the energy conversion system to automatically actuate valves to move gas through the power generation system.

In some embodiments of the invention, drum 30 is fitted with a sensor 46 that measures the rotational position of drum 30. There will be a known relationship between the volume of battery vessel 14 (e.g., the position of mass m of piston 20 or bellows-like structure 22) and the rotational position of drum 30, determinable, for example, from the diameter of drum 30 and Δh and/or Δx. Thus, the output of sensor 46 can be used to control the automatic actuation of one-way valve 25 and/or one-way valve 42.

FIG. 7 provides a simple illustration of the use of sensor 46 to control the automatic actuation of one-way valve 25 and one-way valve 42. As shown in FIG. 7, sensor 46 is at the 12 o'clock position when the volume of battery vessel 14 is at its nadir (e.g., $V_{B1}$). Once one-way valve 25 is actuated to open (e.g., because the gas within thermal energy accumulation vessel 12 has achieved a preset temperature or pressure increase), drum 30 will rotate in direction A as the volume of battery vessel 14 increases from $V_{B1}$ to $V_{B2}$. Suppose the 4 o'clock position corresponds to the maximum volume of battery vessel 14 (e.g., $V_{B2}$). When sensor 46 reaches the 4 o'clock position (shown in phantom), therefore, one-way valve 25 can be actuated to close and one-way valve 42 can be actuated to open. With one-way valve 42 open, drum 30 will rotate in direction B as the volume of battery vessel 14 returns to $V_{B1}$ from $V_{B2}$. When sensor 46 returns to the 12 o'clock position, one-way valve 42 can be actuated to close.

Thus, in general, power generation system 10 converts potential energy stored by battery vessel 14 into electrical energy by using the stored potential energy to drive electrical generator 38.

Gas Recovery and Replenishment

Thermal energy dissipation vessel 16 is used to cool the gas (e.g., by opening a series of vents on the outside of thermal energy dissipation vessel 16) prior to returning it to thermal energy accumulation vessel 12 via pressure line 48, including one-way valve 50, to restart the cycle. Once again, the ideal gas law provides that, as the temperature of a constant amount $n_D$ of gas within the constant volume $V_D$ of thermal energy dissipation vessel 16 decreases from $T_{D1}$ (which will be equal to $T_{B2}$, and thus $T_{A2}$) to $T_{D2}$, the pressure thereof will also decrease (e.g., from $P_{D1}$ to $P_{D2}$).

Of course, one-way valve 50 can, like one-way valves 25 and 42, be automatically actuated. For example, a controller can be programmed to open one-way valve 50 when the gas within thermal energy dissipation vessel 16 undergoes a preset reduction in temperature or pressure or when it reaches a preset absolute temperature or pressure.

In some embodiments of the invention, a reserve gas vessel 52 is connected to thermal energy accumulation vessel 12 via a pressure regulator 54. Pressure regulator 54 is set to maintain a preset baseline pressure (e.g., $P_{A1}$) within thermal energy accumulation vessel 12. For example, if the temperature within thermal energy accumulation vessel 12 drops below $T_{A1}$ overnight, the pressure therein would drop below $P_{A1}$. To ensure that the next power generation cycle does not start at a deficit, therefore, additional gas can be supplied from reserve gas vessel 52 to thermal energy accumulation vessel 12. Conversely, gas can also be evacuated from thermal energy accumulation vessel 12 back into reserve gas vessel 52 whenever desirable.

Typically, the gas within reserve gas vessel 52 will be maintained at a much higher pressure than the preset baseline pressure $P_{A1}$ of thermal energy accumulation vessel 12. In addition, it is desirable to insulate reserve gas vessel 52 against thermal fluctuations, which can be accomplished by burying reserve gas vessel to a point where the ground temperature is relatively constant, which will typically be the case below the freeze line.

Example and Test Results

One example of power generation system 10 has been constructed and tested. In this embodiment, battery vessel 14 has an initial volume (e.g., $V_{B1}$) of 35.2 ft$^3$ and is fitted with a piston 20 weighing 725 pounds.

Thermal energy accumulation vessel 12 was initially charged with outside air at 25° F. to a pressure of 7 psi. Thermal energy was then supplied to the air within thermal energy accumulation vessel 12 by moving power generation system 10 into a climate controlled (e.g., heated) garage. Within this environment, the air within thermal energy accumulation vessel 12 increased in temperature to 70° F., yielding a final pressure within thermal energy accumulation vessel 12 of 7.65 psi.

One way valve 25 connecting thermal energy accumulation vessel 12 and battery vessel 14 was then opened. As the pressure returned to the equilibrium pressure (e.g., $P_B$), piston 20 ascended (i.e., Δh) 4.25 feet to achieve a final volume (e.g., $V_{B2}$) of 38.2 ft$^3$. The corresponding potential energy stored by power generation system 10 was 3081.25 ft-lb, or 4177.6 J.

The stored potential energy was then released to energy conversion system 18 and the electrical output thereof was measured. Table 1 shows the current, voltage, and electrical power outputs. In each case, power generation system 10 was allowed to run for 23 seconds. Distributing the 4177.6 J of stored potential energy over 23 seconds yields a maximum power output of 181.6 W.

TABLE 1

| Trial | I (A) | V (V) | P (W) | Efficiency |
|---|---|---|---|---|
| 1 | 11.27 | 13.1 | 147.637 | 81.30% |
| 2 | 11.24 | 13.1 | 147.244 | 81.08% |
| 3 | 11.25 | 13.2 | 148.5 | 81.77% |
| 4 | 11.27 | 13.2 | 148.764 | 81.92% |
| 5 | 11.26 | 13.1 | 147.506 | 81.23% |
| 6 | 11.25 | 13 | 146.25 | 80.53% |
| 7 | 11.26 | 13.1 | 147.506 | 81.23% |
| 8 | 11.25 | 13.2 | 148.5 | 81.77% |
| 9 | 11.27 | 13.2 | 148.764 | 81.92% |
| 10 | 11.28 | 13.2 | 148.896 | 81.99% |
| 11 | 11.25 | 13.1 | 147.375 | 81.15% |
| 12 | 11.24 | 13.1 | 147.244 | 81.08% |
| 13 | 11.26 | 13.2 | 148.632 | 81.85% |
| 14 | 11.27 | 13.1 | 147.637 | 81.30% |
| 15 | 11.28 | 13.3 | 150.024 | 82.61% |
| 16 | 11.25 | 13.2 | 148.5 | 81.77% |
| 17 | 11.26 | 13.2 | 148.632 | 81.85% |
| 18 | 11.26 | 13.1 | 147.506 | 81.23% |
| 19 | 11.27 | 13.2 | 148.764 | 81.92% |
| 20 | 11.28 | 13.2 | 148.896 | 81.99% |

Thus, relative to extant systems, power generation system 10 has a surprisingly high average output of 148.139 W for an average efficiency of 81.57%.

Although several embodiments of this invention have been described above with a certain degree of particularity, those skilled in the art could make numerous alterations to the disclosed embodiments without departing from the spirit or scope of this invention.

For example, the invention is described above with respect to a single thermal energy accumulation vessel 12. The invention can be practiced, however, with any number of thermal energy accumulation vessels 12. Indeed, a plurality of thermal energy accumulation vessels 12 can be arranged in a "farm." Moreover, a farm of thermal energy accumulation vessels 12 according to the invention can be arranged in a much smaller footprint than a farm of solar panels, for example because a farm of thermal energy accumulation vessels 12 can be arranged both horizontally and vertically.

Likewise, although the invention is described above with respect to a single battery vessel 14, the invention can be practiced with multiple battery vessels 14. For example, in some embodiments of the invention, pairs of "out-of-phase" battery vessels are employed, such that, when one battery vessel in the pair is storing potential energy, the other is releasing it.

It should also be understood that the potential energy stored in battery vessels 14 need not be immediately converted to electrical energy. Indeed, it may be more desirable to store converted thermal energy as gravitational or elastic potential energy for later "on demand" release than to store the converted thermal energy as electrical energy.

As another example, sensors on battery vessel 14 can be used to actuate the one-way valves that allow the gas to move through power generation system 10.

As still another example, although it is preferable that the same amount of gas move from thermal energy accumulation vessel 12 to battery vessel 14 to thermal energy dissipation vessel 16 and then back to thermal energy accumulation vessel 12, the present invention is not so limited.

As yet another example, although the invention has been described in a context where the working fluid remains gaseous throughout the entire cycle, it is within the spirit and scope of the invention to allow for phase changes in the working fluid.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A power generation system, comprising:
   at least one thermal energy accumulation vessel containing a gas;
   a potential energy generation system including at least one battery vessel connected to the at least one thermal energy accumulation vessel, the at least one battery vessel defining a chamber having a variable volume,
   wherein the potential energy generation system generates and stores potential energy via expansion of the volume of the chamber defined by the at least one battery vessel when a quantity of the gas moves from the at least one thermal energy accumulation vessel to the at least one battery vessel after increasing in temperature while in the at least one thermal energy accumulation vessel;
   a thermal energy dissipation vessel connected to the at least one battery vessel via at least one one-way valve; and
   an energy conversion system coupled to the potential energy generation system,
   wherein the energy conversion system converts the potential energy stored by the potential energy generation system into electrical energy only when the at least one one-way valve is opened so that a quantity of the gas is evacuated from the at least one battery vessel and flows through the at least one one-way valve to the thermal energy dissipation vessel after the expansion of the volume of the chamber defined by the at least one battery vessel.

2. The power generation system according to claim 1, wherein the at least one battery vessel comprises a movable mass, and wherein the expansion of the volume of the chamber defined by the at least one battery vessel raises the movable mass, thereby generating and storing gravitational potential energy.

3. The power generation system according to claim 1, wherein the at least one battery vessel comprises a spring, and wherein expansion of the volume of the chamber defined by the at least one battery vessel compresses the spring, thereby generating and storing elastic potential energy.

4. The power generation system according to claim 1, wherein the at least one battery vessel comprises a bellows.

5. The power generation system according to claim 1, wherein the at least one thermal energy accumulation vessel comprises a plurality of thermal energy accumulation chambers.

6. The power generation system according to claim 1, wherein the at least one thermal energy accumulation vessel is connected to the at least one battery vessel via at least one one-way valve.

7. The power generation system according to claim 6, further comprising a controller programmed to actuate the at least one one-way valve connecting the at least one thermal energy accumulation vessel to the at least one battery vessel to allow the quantity of the gas to move from the at least one thermal energy accumulation vessel to the at least one battery vessel.

8. The power generation system according to claim 7, wherein the controller is programmed to open the at least one one-way valve connecting the at least one thermal energy accumulation vessel to the at least one battery vessel when the gas in the at least one thermal energy accumulation vessel increases in temperature by a preset amount and to close the at least one one-way valve connecting the at least one thermal energy accumulation vessel to the at least one battery vessel when the potential energy generation system has generated and stored a preset amount of potential energy.

9. The power generation system according to claim 1, further comprising a controller programmed to actuate the at least one one-way valve to evacuate the quantity of the gas from the at least one battery vessel to the thermal energy dissipation vessel.

10. The power generation system according to claim 9, wherein the controller is programmed to open the at least one one-way valve when the potential energy generation system has generated and stored a preset amount of potential energy and to close the at least one one-way valve when a preset amount of the generated and stored potential energy is converted to electrical energy.

11. The power generation system according to claim 1, wherein the thermal energy dissipation vessel is connected to the at least one thermal energy accumulation vessel via at least one one-way valve, thereby forming a closed-loop power generation system.

12. The power generation system according to claim 1, further comprising an electrical energy storage device coupled to an output of the energy conversion system.

13. The power generation system according to claim 1, wherein the energy conversion system comprises a planetary gear drive.

14. The power generation system according to claim 1, further comprising a reserve gas vessel connected to the at least one thermal energy accumulation vessel via a pressure regulator set to maintain a preset baseline pressure in the at least one thermal energy accumulation vessel.

* * * * *